Oct. 23, 1956 W. E. BRADLEY ET AL 2,768,318

SCREEN STRUCTURE FOR CATHODE RAY TUBES

Filed Oct. 3, 1952 3 Sheets-Sheet 1

INVENTORS
WILLIAM E. BRADLEY
MEIER SADOWSKY
BY
Allen V. Hazeltine
ATTORNEY

INVENTORS
WILLIAM E. BRADLEY
MEIER SADOWSKY
BY
Allan V. Haystone
ATTORNEY

INVENTORS
WILLIAM E. BRADLEY
MEIER SADOWSKY
BY
Allan V. Hagstrom
ATTORNEY

United States Patent Office 2,768,318

Patented Oct. 23, 1956

2,768,318

SCREEN STRUCTURE FOR CATHODE RAY TUBES

William E. Bradley, New Hope, and Meier Sadowsky, Elkins Park, Pa., assignors to Philco Corporation, Philadelphia, Pa., a corporation of Pennsylvania Application October 3, 1952, Serial No. 313,018

10 Claims. (Cl. 313—68)

The present invention relates to new and improved screen structures for cathode ray tubes and, more particularly, to target electrodes comprising different portions which are differently emissive of secondary electrons in response to impingement by primary electrons.

For some time the need has existed for a target electrode, for use in cathode ray tubes and the like, said target electrode comprising a plurality of discrete regions, each of which differs substantially in its secondary electron emissive characteristics from the other regions of the target electrode. Such an electrode is useful in numerous applications. For example, in certain types of color television systems there is transmitted a signal which, during extremely brief and rapidly recurrent intervals, is representative of intelligence respecting three different primary colors such as red, green and blue, for example. A particularly convenient way of utilizing this signal at a receiver, to produce a picture in full color, is to apply the signal to the beam intensity control grid of a cathode ray tube whose screen structure is constituted of a large number of minute phosphor elements, different ones of these elements being responsive to electron beam impingement to emit light of the same three primary colors and the scanning of this screen structure by the electron beam being arranged so that the beam impinges upon a screen element emissive of red light, for example, during the exact interval during which the received signal is also representative of red light information.

If absolute synchronism between the scanning of the receiver cathode ray tube by its electron beam and the scanning of the transmitter camera tube by the electron beam of the latter could be maintained, and if the rate of occurrence of the intervals during which the received signal is representative of different color information were invariant, then reproduction of the televised image in full color on the receiver tube screen could be achieved without further difficulty. However, it is well known that maintenance of scanning synchronism with the required accuracy is impractical and that, in any event, the rate of occurrence of intelligence in the received signal is subject to unpredictable fluctuations because of variations in the transmission characteristics of the path traversed by the signal between the transmitter and the receiver. Therefore it is preferred to maintain the scanning synchronism between transmitter and receiver only to the extent to which standard production methods permit this to be done. Compensation for failure of the electron beam to impinge upon a screen element emissive of light of a particular color at the exact time when the received signal is representative of intelligence regarding this color can then be effected by producing indications of beam impingement upon regions of the screen structure which bear a known geometrical relationship to the colored light emissive phosphor elements of this screen structure, and by utilizing these indications to correct either the rate of scanning of the beam, or the rate of application of the signal to the beam intensity control grid, or both. It is apparent that, in order to obtain the desired indications of beam impingement upon particular regions of the screen structure, these particular regions must be differently responsive to electron impingement that other regions of the screen structure. To achieve this differentiation it has been proposed to construct some regions of the screen structure in such a manner that their secondary emission, in response to electron beam impingement, differs substantially from that of other regions. By appropriate means there may then be derived a signal which varies as the electron beam of the cathode ray tube is deflected from a region of one secondary emission characteristic to a region of a different secondary emission characteristic. This signal can then be utilized, in the manner hereinbefore briefly indicated, to assure proper synchronism between the occurrence of different color information in the received signal and the impingement of the beam on different colored light emissive phosphor elements.

A scheme of this general nature has great advantages inasmuch as it requires only electrical circuits and dispenses with the complicated optical devices involving color filters and photocells which are otherwise needed to provide the desired selective indications of beam impingement upon particular regions of the screen structure. Thus far, however, attempts to achieve a practical screen structure which has the desired characteristics—namely substantially different secondary electron emission from certain portions than from others—have not met with complete success. More specifically, attempts to build such screen structures have not been entirely successful either because the finished screen structures exhibited only relatively slight differences in secondary emission properties from one region to another, or because, to the extent that such differences were achieved, they were non-uniform—varying not only from one screen to another but even as between different regions of a single screen structure. In fact, in some instances it has proved impossible to predict in advance whether a given screen area will have higher or lower secondary emissivity than another screen area. It will be noted that, if the differences in secondary emission characteristics of different regions of the screen are only slight, then deflection of the electron beam across different ones of these regions will produce a very small output signal which will be inherently difficult to detect and to utilize and which will, in addition, be highly susceptible to contamination by noise. On the other hand, the aforementioned inability to predict the polarity of the difference in secondary emission from different screen areas makes it difficult, if not impossible, to construct circuitry capable of utilizing the output signal without the introduction of ambiguities.

The unpredictable behavior of prior structures is believed to result from the fact that their construction was based on the theory that, under any given set of ambient operating conditions, such as beam impingement velocity, secondary electron collector voltage, and the like, any given substance was characterized by certain fixed secondary electron emission characteristics. In applying this theory it was attempted to achieve the desired differences in secondary electron emission characteristics by constructing different regions of the surface portions of the screen structure of substances having, under the same operating conditions, as widely different inherent secondary electron emission characteristics as possible. We have discovered, however, that there are other factors which exercise an even greater controlling effect over the differences in secondary emission from different screen areas, and the utilization of which permit us to obtain results much more satisfactory than those which have been obtained heretofore, as will be pointed out more fully hereinafter.

The prior art failure to recognize the principles underlying our invention resulted not only in failure to produce entirely successful screen structures for color television receiver tubes, but also in failure to make full utilization of the phenomenon of secondary emission in other cathode ray tube applications. For example, to adapt a cathode ray tube for use as a television camera tube, it is necessary to construct the screen in such a manner that its response to electron beam impingement will vary in accordance with variations in the luminance of the scene which is to be televised. If it were possible to vary the secondary emission characteristic of the screen structure depending upon its illumination, then scanning of the screen structure by the electron beam would produce the desired output signal indicative of variations in the luminance of the televised scene. However, as has been indicated, it was thought heretofore that the secondary emission characteristic of a screen structure depended principally upon the composition of its beam impinged surface material. Since no satisfactory means was known whereby light shining on the screen structure could be made to produce reversible changes in the composition of such surface material, the utilization of differences in secondary emission characteristic to produce an electrical signal representative of the illumination of a screen structure was believed to be unfeasible.

Similarly it has not heretofore been feasible to construct storage tubes in which a scanning electron beam, whose intensity is varied in response to an intelligence signal, is effective to modify the secondary emissivities of different areas of the scanned screen in accordance with said intensity variations, thereby to create a pattern of regions of different secondary emissivities indicative of said variations and from which there may later be read off, by a similar scanning process, a replica of the stored signal.

Both of these desirable objectives, as well as others, may now be achieved by applying the principles of our invention in ways which will be pointed out more fully hereinafter.

Accordingly, it is a primary object of the invention to provide a new and improved screen structure for cathode ray tubes.

It is another object of the invention to provide an improved screen structure for cathode ray tubes, having different regions with different secondary electron emission characteristics.

It is a further object of the invention to provide a screen structure for cathode ray tubes, having different regions whose secondary electron emissivities differ widely and with predictable polarity.

It is still another object of the invention to provide a screen structure for cathode ray tubes, having different regions fluorescent in different colors in response to electron impingement, and also having different regions of different secondary electron emissivities, these last-named regions being disposed in predetermined geometrical configuration relative to the fluorescent regions.

It is a still further object of the invention to provide a screen structure for cathode ray tubes whose secondary electron emissivity varies in response to variations in the intensity of a stimulus, such as light or a beam of primary electrons, when this stimulus is applied to the screen structure.

We have discovered that the number of secondary electrons emitted by a surface impinged by primary electrons depends not only on the inherent secondary emission characteristics of the surface material, as was heretofore believed, but can also be controlled, and with much greater effectiveness, by judicious selection of the characteristics and/or properties of material underlying the surface material which is directly impinged by the primary electrons. More particularly we have discovered that wide variations in the effective secondary emissivity of the surface layer can be produced by varying the resistance to the flow of electrical current of material underlying the secondary electron emissive surface layer. Preferably, but not necessarily, the current flow in question takes place between the beam-impinged surface and a layer of conductive material underneath the material of variable resistance. Our investigations have indicated that there are at least two principal ways in which this resistance variation can be accomplished. One way involves varying the resistivity of material underlying the secondary electron emissive surface layer, while another involves varying the thickness of underlying material of a given resistivity. Either of these expedients or a combination of them, it appears, is effective to produce a variation in the resistance to the flow of electrical currents in the underlying layer. Our investigations have shown that if the underlying material is made of high resistance to the flow of electrical currents, either by using a material of high resistivity or by using a relatively thick portion of material of lower resistivity, the effective secondary emissivity of the surface layer will be less than if the underlying material is made of relatively lower resistance to the flow of electrical currents, either by using a material of low resistivity or by using a relatively thin portion of material.

It will be noted that while the effect of either increasing the specific resistivity of the underlying material or its thickness will be to increase the resistance to the flow of electrical currents in the direction normal to the secondary emissive surface, the effect of the former is also to increase the resistance to the flow of electrical current in directions parallel to the surface while the effect of the latter is to decrease the resistance to the flow of such currents. From this it appears that the resistance to flow of current in the direction normal to the secondary emissive surface is the major factor in controlling the effective secondary emissivity of the surface. While it is believed that such is the case, we do not propose to be bound thereby since, from our investigations, it appears that the resistance to the flow of currents in directions parallel to the surface may also be of substantial significance.

The foregoing principles are susceptible of embodiment in many specific forms, some of which are disclosed in detail hereinafter, and others of which will occur to those skilled in the art in the light of such disclosure. One embodiment of the invention, for example, may comprise a surface layer of a secondary emissive material adapted to be impinged by electrons, and an underlying contiguous layer of material, the resistance to the flow of electrical currents of certain portions of said underlying layer differing substantially from that of other portions of said layer. In such an embodiment employing a surface layer of relatively uniform inherent secondary emissivity over its entire expanse and relying solely on differences in the resistances to the flow of electrical currents of different portions of the underlying layer, it is possible to obtain differences in the effective secondary emissivities of different portions of the surface layer which exceed by several hundred percent the differences which can be obtained solely by the use of materials of different inherent secondary emissivities and without the underlying layer of varying resistance in accordance with the present invention.

Such an embodiment of the invention is eminently adapted for use in the reproducing tube of a color television receiver, and accordingly the detailed construction of such an embodiment and the manner of its use in such a receiver will be described in detail hereinafter.

The theoretical reasons why control of the electron emissivity of the surface layer may be effected by controlling the resistance of the underlying material are as yet not fully understood. However, some tentative conclusions may be drawn from the operation of specific embodiments of the invention. For example, in the aforementioned embodiment of the invention in a color television reproducing tube, it is, for purposes which are explained hereinafter, desired to obtain different electron emissive characteristics for closely spaced regions of the screen surface. To this end, the resistance of the underlying layer is made to vary over these same closely spaced regions. As the electron beam then scans this screen structure, it will traverse, in rapid succession, alternate regions of high and low underlying resistance. On the surface of regions of low resistance, there will be built up, by secondary electron emission from this surface, a lower positive potential than is built up on the surface of regions of high resistance. The secondary electron emission from regions of low potential, which correspond to regions of low underlying resistance, will then be greatly enhanced by the proximity of nearby regions of high positive potential, while the emission of electrons from regions of high potential, which correspond to regions of high underlying resistance, will be suppressed by the proximity of nearby regions of low positive potential. Thus, the emission from any particular region of the screen surface appears to be controlled by the potentials of adjacent regions in a manner which recalls the operation of a control grid electrode in a vacuum tube. It is to be borne in mind, however, that this simple explanation of the observed effects may not be definitive, inasmuch as variations in secondary electron emissivity of the surface layer have been observed even though the regions whose underlying resistance was being varied were considered too large to be subject to the aforedescribed control by adjacent regions of different underlying resistance.

The construction and operation of embodiments of our invention will be better understood from the following description in conjunction with the accompanying drawings wherein.

Figures 1, 2:
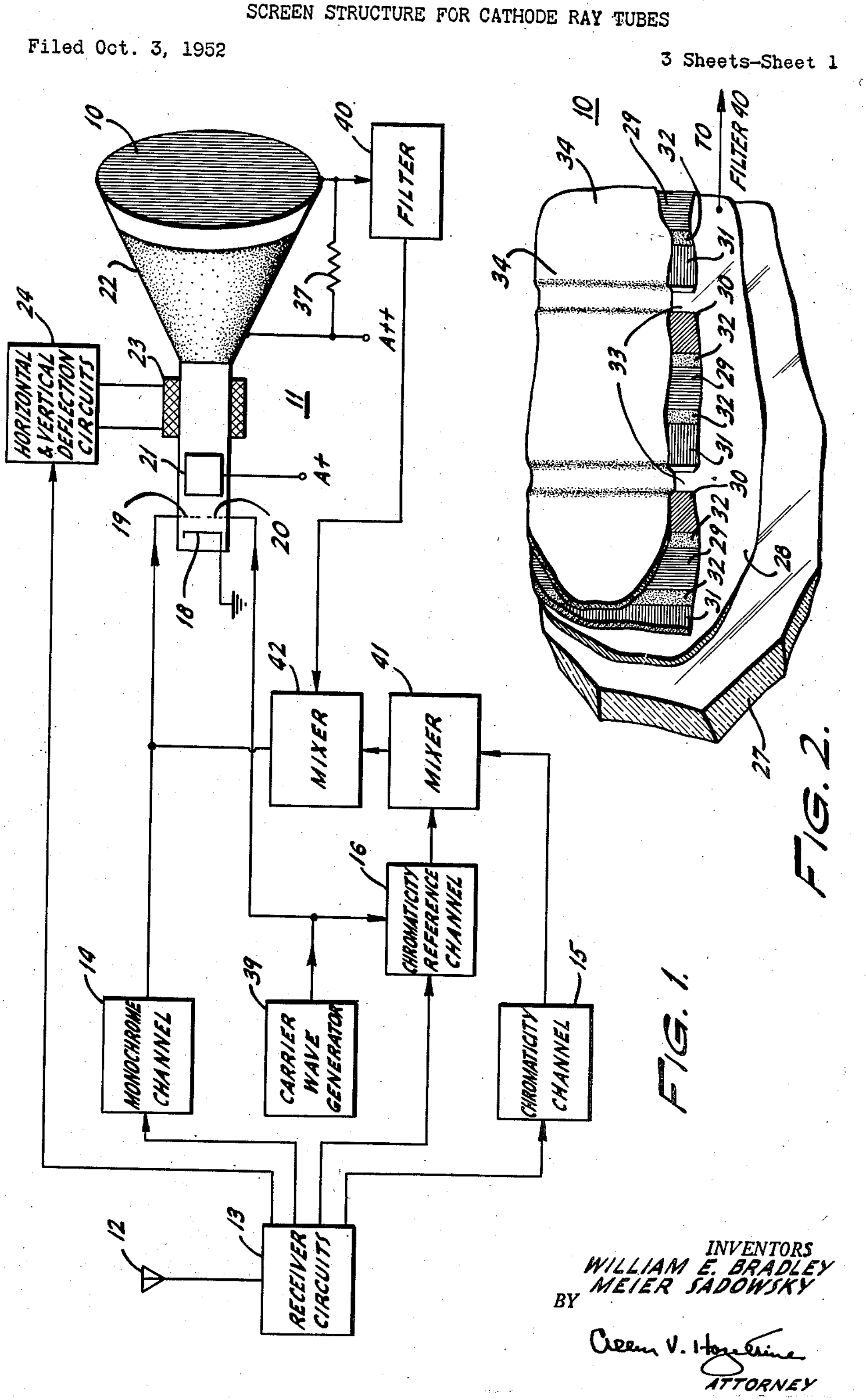
Figure 1 shows a color television receiver system including a cathode ray tube equipped with a screen structure which embodies our invention.
Figure 2 is a greatly enlarged fragmentary view of the screen structure of Figure 1 showing its structural details.

For a full appreciation and understanding of the advantages and mode of operation of our invention it will be desirable to describe its use in various representative applications. Accordingly it will be described first with reference to its use in a color television receiving system, and subsequently with reference to its use in a television camera system and in a signal storage system.

As has been previously indicated, the color television signal for whose reproduction one form of the screen structurs embodying our invention is particularly designed, is representative of different color intelligence during time-spaced, rapidly recurrent intervals of short duration. More particularly, this signal may comprise, when reduced to its lowest, or video frequency range, a first signal component occupying approximately the 0 to 3 megacycle frequency range and representative of the monochrome intelligence of the televised scene. The signal may further comprise a component occupying approximately the 3.3 to 4 megacycle frequency range and representative of the chromaticity intelligence of the televised scene.

The manner in which these two signal components are produced at the transmitter is immaterial for the purposes of our invention. For example, however, the monochrome signal may be formed by combining, in suitable proportions, the 0 to 3 megacycle components from three simultaneously scanning television cameras respectively responsive to the red, green and blue elements of the televised scene. The chromaticity component, on the other hand, may be formed by producing two subcarrier signals, of equal frequency such as 3.89 megacycles, for example, but in quadrature phase relationship, by further producing a first signal representative of the 0 to .6 megacycle frequency components of the instantaneous difference between the red camera output signal and the monochrome signal and a second signal consisting of the 0 to .6 megacycle frequency components of the difference between the blue camera output signal and the monochrome signal, and by employing these last-named difference signals to modulate respectively the two subcarriers at 3.89 megacycles. The signals resulting from these modulations are additively combined to produce a single subcarrier signal, amplitude- and phase-modulated in accordance with the aforementioned color difference signals. Preferably, and in order to conserve bandwidth, only the lower sidebands produced by this modulation process are transmitted, thereby constituting the transmitted chromaticity signal occupying the 3.3 to 4 megacycle frequency range as hereinbefore stated. Together, these monochrome and chromaticity components constitute the signal which has been described as being representative of intelligence respecting the three different primary colors at three different intervals during each cycle of the chromaticity component.

In addition to its monochrome and chromaticity components, the composite video signal also comprises the necessary conventional horizontal and vertical synchronizing pulses pedestaled on the conventional blanking pulses. In order to provide a phase reference signal for the phase-modulated, chromaticity-representative subcarrier signal there is additionally provided a burst of unmodulated 3.89 megacycle sinewave, bearing predetermined reference phase relationship to the unmodulated quadrature subcarriers and superposed upon the trailing portions, sometimes called the "back porches," of the blanking pulses, upon whose leading portions the horizontal line synchronizing pulses are superposed. In the receiver system illustrated in Figure 1, to which particular reference may now be had, the signal constituted as hereinbefore explained and, of course, modulated onto a suitable radio frequency carrier, is intercepted by antenna 12 and supplied to conventional receiver circuits 13 which may comprise the usual radio frequency amplifier, converter, intermediate frequency amplifier and video detector. In addition, these receiver circuits 13 may comprise suitable components adapted to separate the composite signal, either before or after reduction to the video frequency range, into the different video frequency components hereinbefore enumerated. Thus the receiver circuits 13 may include the conventional horizontal and vertical synchronizing pulse separating circuits common to all color television receivers. Furthermore, these receiver circuits may comprise a low-pass filter transmissive only of signals in the 0 to 3 megacycle frequency range and thereby operative to separate the monochrome component of the video signal from the other components. The monochrome component thus separated may then be supplied to the monochrome channel 14. The receiver circuits 13 may also comprise a bandpass filter operative to transmit signals only in the 3.3 to 4 megacycle frequency range, thereby operating to separate the chromaticity component from the other components, the former being supplied to chromaticity channel 15. Finally, the receiver circuits 13 may include circuits for separating the color synchronizing bursts from the remainder of the signal. These color synchronizing burst separating circuits may be of any conventional form, consisting, for example, of a gated amplifier responsive to transmit signals only during the horizontal blanking pulse intervals, this amplifier being followed by a narrow bandpass filter transmissive only of 3.89 megacycle frequency signals to the substantial exclusion of all other signals. At the output of this narrow bandpass filter, the separated color synchronizing signal is then available, this signal being supplied to chromaticity reference channel 16. All of the circuits hereinbefore briefly described, and represented in Figure 1 by the block designated receiver circuits 13, are entirely conventional and are illustrated and described in more detail in the copending application of Stephen W. Moulton, Serial No. 290,775, filed May 29, 1952, and assigned to the assignee of the present invention.

As is the usual practice in color television receivers, the monochrome and chromaticity representative signals in channels 14 and 15 respectively are to be utilized to produce an image in full color corresponding to the televised scene on the screen structure 10 of cathode ray tube 11. This cathode ray tube comprises a conventional cathode 18, a pair of electron beam intensity control grids 19 and 20, an electron beam accelerating anode 21 supplied with suitable first anode potential from a source of such potential A+, and a second anode 22 supplied with suitable anode potential from a source of such potential A++. The cathode ray tube 11 is also provided with conventional horizontal and vertical deflecting coils 23 supplied with suitable horizontal and vertical deflecting signals from deflecting circuits 24 and responsive thereto to deflect the electrons projected from cathode 18 to cause them to trace a conventional scanning raster on the screen structure 10. The two separate beam intensity control grid electrodes 19 and 20 are constructed so as to separate the electron stream originating at cathode 18 into two separate portions, the different intensity control grids being then operative to control the intensity of these different portions, preferably without substantial interaction between them. The separate beams thus formed with separately controllable intensities are then projected in conventional manner toward the screen structure 10, being preferably brought to impingement thereon at closely adjacent regions of this screen structure. The manner in which the control grid electrodes 19 and 20 must be constructed and arranged in order to operate in the fashion hereinbefore outlined is fully described and illustrated in copending U. S. patent application of Melvin E. Partin, Serial No. 242,264, filed August 17, 1951, and assigned to the assignee of the present invention. Consequently no further description of the constructional details of these control grids is required here. The reasons for the provision of these separate control grids are also explained in the said Partin application and will be only briefly recapitulated hereinafter.

A greatly enlarged fragmentary perspective view of the screen structure 10 which, as has been indicated, constitutes the essence of our invention, is shown in Figure 2 of the drawings, to which more particular reference may now be had. This screen structure is formed on the beam confronting surface of a transparent substrate 27 of some dielectric such as glass which may be the glass faceplate of the cathode ray tube, for example. The screen structure itself comprises a thin layer of transparent conductive material 28 deposited directly on the substrate and formed of some material such as stannic oxide, for example. On the beam confronting side of this conductive layer 28 there are arranged a plurality of parallel strips 29, 30 and 31, all constituted of activated phosphor materials. Of these various strips, those designated 29 are made of phosphor materials responsive to electron beam impingement to emit red light, while strips 30 are made of phosphor materials responsive to electron beam impingement to emit green light and strips 31 are made of phosphor materials responsive to electron beam impingement to emit blue light. Particular phosphors suitable for the aforedescribed purposes are well known. For example, zinc phosphate is a suitable red phosphor, zinc orthosilicate a green phosphor and calcium magnesium silicate a blue phosphor. For reasons which are not essential to the practice of our invention, but which will appear hereinafter, strips 29, 30 and 31 are preferably spaced from each other, the interstices between any two consecutive strips 29 and 30 and between any strips 29 and 31 being filled with strips 32 of a material such as unactivated willemite having substantially the same resistivity as the phosphor materials themselves. On the other hand, the spaces 33 between consecutive green light emissive strips 30 and blue light emissive strips 31 are left unfilled. Over the entire beam confronting side of the sandwich-like structure hereinbefore described, there is deposited an additional layer 34 of a material having, preferably, an inherently high secondary emission characteristic at the potentials at which cathode ray tube screen structures are normally operated. A material which is particularly suitable for use in secondary electron emissive layer 34 is magnesium oxide. Others are gold, silver, tungsten and the like. Wherever this material of high secondary emissivity overlies activated phosphor strips or unactivated willemite, it will be spaced from the conductive layer 28 by this intervening material. In the unfilled spaces 33 between green light emissive phosphor strips 30 and blue light emissive phosphor strips 31, on the other hand, the top layer 34 will actually come in contact with the conductive material 28.

The aforedescribed screen structure may be formed in any conventional manner. For example, each phosphor may be prepared in a separate photosensitive emulsion, these emulsions being then successively deposited over the entire substrate in uniform layers. This may be accomplished in any desired manner, as by spraying, for example. After deposition of each phosphor emulsion, and before deposition of the next, the screen may then be exposed through a mask which has apertures so disposed that only the regions where strips of that particular phosphor are to be formed will be illuminated. The unexposed portions, which remain water soluble, are then washed away, leaving the desired phosphor deposited in the desired strip configuration. Details of this process are described in the copending U. S. patent application of John W. Tiley, Serial No. 248,356, filed September 26, 1951, and assigned to the assignee of the present invention. After all three phosphors and the unactivated willemite have been deposited in this manner, a uniform layer of magnesium oxide may be sprayed over the entire area thereby readying the screen structure for further conventional processing.

As has been previously indicated, it is desired to have the electron beam of the cathode ray tube impinge upon a phosphor strip emissive of light of a particular color during the particular interval when the signal applied to the cathode ray tube to control the beam intensity thereof is representative of intelligence respecting the same color. It has further been indicated that, both because of the non-uniform scanning of the electron beam across the screen structure and because of non-uniformities in the rate of occurrence of intervals in the received signal, the desired synchronism between the intervals of impingement of the cathode ray beam on a particular colored light emissive phosphor strip and the intervals during which the applied signal is representative of corresponding color information can best be obtained by deriving, from the screen structure proper, indications of actual beam impingement upon particular portions thereof and by utilizing these indications to control the rate of application of the intelligence signal to the cathode ray tube. The screen structure illustrated in Figure 2 is particularly adapted to provide such indications because, as the beam scans across the screen structure in a direction transverse to the longitudinal dimension of the phosphor strips, it impinges alternately upon portions of the screen structure where the magnesium oxide surface layer 34 is insulated from the conductive layer 28 by phosphor strips or unactivated willemite strips, and upon other portions where the magnesium oxide surface layer 34 is in conductive contact with the conductive layer 28. From those portions where the magnesium oxide is insulated from the conductive layer, a relatively small number of secondary electrons is emitted upon impingement by the electron beam. On the other hand, from portions of the magnesium oxide which are in contact with the conductive layer 28, a relatively large number of secondary electrons is emitted upon impingement by the electron beam even though the beam intensity be the same as it was when the beam was impingent upon insulated portions of the magnesium oxide layer. These variations in secondary electron emission from the screen structure, as the beam traverses different regions thereof, produce variations in the current flowing to the screen from the conventional source of screen potential constituted by second anode potential source A++ and resistor 37.

Because the chromaticity component derived from receiver circuits 13 as hereinbefore indicated, will, by the time it is applied to beam intensity control grid 19, have been made to vary at a nominal frequency equal to the rate of beam traversal of successive phosphor strips emissive of light of a particular color, the intensity of the beam controlled by grid 19 will also be modulated at this rate. Consequently, there will be produced, across screen output resistor 37, variations in potential at or near the same frequency as the variations produced by beam impingement upon successive portions 33 of the screen structure at which the magnesium oxide is in direct contact with the conductive surface layer, of which there is one for each group of three phosphor strips. The variations due to beam modulation would then be difficult to distinguish from the desired indexing indications. To avoid this contamination of indexing indications with video signal intelligence, there is provided, in a receiver embodying our invention, a carrier wave generator 39, conventionally constructed to produce a continuous signal of a predetermined high frequency, such as 24.5 megacycles, for example, lying well above the range of all video components supplied to the cathode ray tube beam intensity control grid 19. According to present standards, the number of phosphor strips constituting the screen surface and the horizontal scanning rate are so chosen as to require the application of a chromaticity component of 7 megacycle nominal frequency to the beam intensity control grid 19. As this 7 megacycle component, subject only to variations in accordance with signal intelligence over a range extending from 6.4 to 7.1 megacycles, is the highest frequency component of the signal supplied to this control grid, the aforementioned 24.5 megacycle frequency will be sufficiently high for present purposes. The signal produced by carrier wave generator 39 is supplied directly to beam intensity control grid 20 where it produces variations in beam intensity and of screen current at a 24.5 megacycle rate. As the beam controlled by grid 20 traverses consecutive indexing portions of the screen structure, the amplitude of the 24.5 megacycle screen current variations will vary at the 7 megacycle rate of traversal of these indexing portions. Consequently, there will appear across resistor 37 a signal of 24.5 megacycle nominal frequency, amplitude modulated at the aforementioned 7 megacycle rate. Filter 40 is provided in order to select the upper modulation sideband of the signal produced across screen resistor 37 in this manner, this being a signal of 31.5 megacycle nominal frequency, subject to phase variations due to non-linearity of the beam sweep and inaccuracy of phosphor strip spacing. This filter may be of any conventional construction, provided only it has the aforementioned frequency selective characteristics. Note that beam intensity modulation by means of the video signal will produce no component at this selected frequency and will therefore not contaminate the indexing signal.

Although it is feasible to apply the video signal and the carrier wave signal to one and the same beam intensity control grid, the aforedescribed construction with separately controlled beams is preferred, because any tendency of a single grid and cathode structure to produce undesired beats between the applied signals is inherently eliminated.

Considering now the manner of application of video signals to the beam intensity control grid 19 of the cathode ray tube, it will be recalled, first of all, that the monochrome signal components are separated from the other components of the composite video signal in receiver circuits 13. These separated monochrome components are then supplied to the beam intensity control grid 19 of the cathode ray tube by way of monochrome channel 14 as hereinbefore indicated. The chromaticity component of the composite signal is likewise separated from the other components of the signal and is supplied to chromaticity channel 15. In this channel there will then be available the chromaticity component of 3.89 megacycle nominal frequency, single sideband modulated in accordance with chromaticity intelligence.

The aforedescribed color synchronizing signal, which has also been separated from the remainder of the video signal components in receiver circuits 13 and subsequently supplied to chromaticity reference channel 16, is heterodyned, in a conventional mixer incorporated in this chromaticity reference channel, with the aforementioned 24.5 megacycle output signal of carrier wave generator 39. The difference frequency heterodyne component, at 20.6 megacycles, produced by this heterodyning operation is derived and utilized as the output signal of chromaticity reference channel 16. This 20.6 megacycle signal will then bear the same reference phase relationship to the chromaticity component as did the original color synchronizing signal of 3.89 megacycle frequency The 20.6 megacycle output signal of chromaticity reference channel 16 and the received chromaticity component separately present in chromaticity channel 15 are then respectively supplied to the two input circuits of a conventional mixer 41. The sum frequency heterodyne component, at 24.5 megacycle nominal frequency, produced by this mixer 41 is then preferably derived therefrom. This signal derived from mixer 41 will now bear the phase and amplitude modulation of the received chromaticity component relative to the signal of reference phase represented by the 20.6 megacycle signal derived from the chromaticity reference channel 16. This 24.5 megacycle output signal from mixer 41 is now supplied to one input circuit of a second mixer 42, the output signal from filter 40 being supplied to the other input circuit of mixer 42. The difference frequency heterodyne component produced by mixer 42, at 7 megacycle nominal frequency, is then derived from this mixer and supplied directly to beam intensity control grid 19 of the cathode ray tube. This 7 megacycle signal will now bear not only the phase and amplitude modulation of the received chromaticity component but will also bear the phase modulation of the indexing signal derived from filter 40. Thus the signal produced by mixer 42 will not only be representative of intelligence respecting the three different primary colors at three intervals during each cycle, but also the phase of this signal, and with it the particular times at which these color intelligence representative intervals occur, will adjust itself to the actual requirements of beam impingement synchronism, taking into account both variations in sweep linearity and inaccuracies in phosphor strip spacing.

In considering the system of Figure 1, it is to be borne in mind that no invention is predicated upon the over-all system itself, all the components thereof, as well as their interconnection and cooperation as hereinbefore explained, being known and described in prior patent applications such as, for example, the aforementioned copending Moulton application, Serial No. 290,775. Referring now once more to the detailed view of the screen structure shown in Figure 2, it will be recalled that the differences in the number of secondary electrons emitted from different portions of this screen structure upon beam impingement thereon are attributable, at least to the most pronounced extent, to variations in the resistance to the flow of electrical currents, of the material underlying the secondary electron emissive surface layer. In the particular embodiment illustrated, these variations are produced by utilizing the high resistance properties of the activated phosphors. Those gaps between phosphors from which no indexing signal is desired are filled with a material such as unactivated willemite (zinc orthosilicate) which has an electrical resistivity substantially equal to that of the common phosphor materials. Other unactivated phosphors can also be used, provided their resistance is substantially equal to that of the activated phosphors used for light emission. On the other hand, the magnesium oxide is preferably placed in direct contact with the high conductive layer 28 in those gaps between phosphor strips from which an indexing signal is desired. For simplicity of manufacture, it is preferred to have the conductive layer 28 extend over the entire surface of the glass substrate 27. However, it is perfectly feasible, as an alternative, to provide a common conductive layer only for those portions of the screen structure where it is desired to have it contact the magnesium oxide. In this alternative arrangement the conductive material would be deposited in strips in spaces 33 while the phosphor strips and the willemite strips would then be deposited directly on the glass substrate. The individual strips of conductive material would then be conductively interconnected only at one or both edges of the screen structures. To reach the equipotential region formed by these conductive strips, the current flowing through the high resistance phosphor strips will also have to flow through the glass substrate, at least for a portion of its path. Therefore, the total resistance to current flow of the high resistance (low emission) screen portions will be the sum of the resistances of the current traversed phosphor and of the current traversed glass portions. Since glass is an insulator, this total resistance will be greater than it is when the conductive layer extends over the entire substrate, since the current then does not need to traverse any portion of the glass substrate to reach the conductor. However, the resistance to current flow of low resistance (high emission) portions will be the same in both cases. Therefore the differences in resistance and consequently also the differences in secondary emission characteristics of different screen regions will be greater in the alternative arrangement where the conductive material is formed in discrete strips. However, we have found that in practice it is possible to obtain sufficiently large differences in the number of secondary electrons emitted from different portions of the screen structure even though the conductive layer 28 is provided over the entire area of the glass substrate as illustrated in Figure 2 and we prefer to adopt this simpler structure.

We have found that, for best operation, the surface layer of screen structures embodying our invention is preferably made of a material which has considerably higher resistance to current flow in a direction parallel to this surface than in a direction normal to it. While the reasons for this are not entirely certain, it is our present belief that, when this condition is fulfilled and the surface material is inherently highly emissive of electrons, then any particular region of the screen upon which the beam is caused to impinge will emit more electrons than it receives and will charge up to a positive potential. Because lateral conduction from this region is inhibited by the relatively high lateral resistance specified for this surface material, the surrounding portions of the screen surface will remain uncharged. The electric field set up by the interaction of the positively charged beam impinged portion and the surrounding uncharged portion will have the effect of limiting the maximum value which the positive potential can reach. The intensity of the net emission current flowing from the beam-impinged screen portion will then depend almost exclusively on the resistance of the interior material which interconnects the surface portion of limited positive potential and the equipotential conductive layer which is at the base of the screen structure. Magnesium oxide fulfills the foregoing requirements particularly well as it has relatively low resistance whenever it is impinged by an electron beam and relatively high resistance when it is not. Consequently the beam impinged portion of a magnesium oxide surface layer will have the desired low transverse resistance, while unimpinged portions will retain their high lateral resistance. Others of the surface materials hereinbefore mentioned, such as gold, silver and tungsten are normally conductive, but, when they are deposited in a sufficiently thin layer, their transverse resistance is also observed to be substantially less than their lateral resistance. In any event, the surface layer should be sufficiently thin so that at least some of the electrons of the impinging beam penetrate all the way through this surface layer and into the underlying material.

In the case of a practical color television screen structure for operation at 15 to 20 kilovolts, a magnesium oxide layer of the proper thickness may be formed by first covering the previously formed portions of the screen structure with a solution of polyvinyl alcohol and ammonium dichromate in water and denatured alcohol, draining this solution for about one minute in such a manner that runoff takes place parallel to the phosphor strips, drying the screen in air and then spraying the remaining deposit with a solution having equal volumes of magnesium oxide powder and denatured alcohol until the solution has reached such a depth that it is opaque to red light. After partially drying the deposited solution it is exposed for approximately five minutes to illumination by a D.-C. arc lamp placed at a distance of five feet from the screen. This causes the previously deposited polyvinyl alcohol, which now has magnesium oxide from the spray solution mixed with it, to become insoluble in water and this layer remains deposited on the screen when the unexposed portions of the deposit are subsequently washed off by a stream of water which is directed against the deposit for about three minutes.

It will further be understood that it is not essential to our invention that the secondary electron emissive surface layer 34 extend continuously over the entire screen structure. It is, of course, a great convenience in the manufacturing process to have this surface layer be substantially continuous over the entire screen structure, as this eliminates all problems of registry and masking in the deposition process of the surface layer, permitting the depostion of this layer by a simple overall spraying or evaporating method. In fact, it is one of the remarkable advantages of our invention, distinguishing it from previous screen structures intended for the same general purporse, that the variations in secondary electron emissivity of the surface of the screen structure are not due to the variations in the nature of the surface material but are due to variations in the nature of the underlying material, thus permitting the use of a uniformly deposited surface material.

In the screen structure illustrated in Figure 2 of the drawings, the construction is such that an increase in secondary electron emissivity is obtained once for each phosphor strip emissive of light of a particular color. This produces an indexing signal having a fundamental component of the same frequency as the nominal frequency of the chromaticity signal applied to the beam intensity control grid of the cathode ray tube. As has been explained, this similarity in the two frequencies necessitates the provision of the carrier wave generator 39 of Figure 1, in order to effect frequency separation between the desired indexing signal produced by the traversal of indexing portions of the screen structure and the undesired signal produced by video modulation of the beam by the chromaticity signal. Other ways are known for obtaining indexing indications which are distinguishable, by their frequency, from variations in the screen output signal due to video modulation of the beam. For example, by providing a portion of high secondary electron emissivity only for every third phosphor strip emissive of light of a particular color, the indexing signal produced by beam scanning of the screen structure will be at a frequency equal to one-third the nominal frequency of the chromaticity component of the video signal. If this construction is adopted for the screen structure of Figure 2, then, with the same basic beam deflection rate and number of phosphor strips, the indexing signal produced will have a nominal two and two-thirds megacycle frequency. The chromaticity signal applied to the beam control grid electrode, on the other hand, will still have a frequency of 7 megacycles. As a result, the fluctuations in screen output current due to beam scanning traversal of the screen structure will be readily distinguishable from variations in the screen current produced by video modulation of the beam. A system for utilizing the indexing indications produced at this so-called "subharmonic" rate is fully described in the copending application of Robert C. Moore and Richard G. Clapp, Serial No. 261,014, filed December 12, 1951, and assigned to the assignee of the present invention. Since the system described in this copending application can be utilized exactly as shown therein in connection with a signal produced by the indexing screen structure herein described, it is not necessary to reproduce the description here.

As has been indicated, the nature of the composite television signal is such that it is representative of information respecting any one particular color only during an extremely brief interval in the course of each cycle of the chromaticity component. The duration of each such interval is, in fact, only a very small fraction of the duration of such a cyclical variation. At other times during each such cyclical variation, the composite video signal will be representative either of intelligence respecting a different color or of intelligence respecting no particular color at all. If then, as is the case in certain proposed forms of composite video signals, the intervals during which the signal is representative of intelligence with regard to different colors are equally spaced during each cycle of the chromaticity component, and if the phosphor strips of the screen structure, upon which this composite signal is to be reproduced, fill the entire area of the screen structure, being disposed immediately adjacent each other, then these phosphor strips will be activated by the video signal not only during these intervals when the signal is accurately representative of colored light intelligence but also during the intervening intervals when the signal is not accurately representative of such intelligence. If, on the other hand, the phosphor strips are made so narrow that the beam will impinge upon them only during the intervals when its intensity is controlled in accordance with colored light intelligence, then they will be so narrow as to produce a total amount of light insufficient for practical viewing. Consequently, it has been found desirable to compromise between the requirements of color purity and light output by spacing the phosphor strips from each other, thereby reducing the total illumination somewhat from what it would be if these strips were contiguous but also reducing the extent to which the strips are responsive to portions of the signal not representative of intelligence. In practice it has been found that phosphor strips occupying about 75 to 90 percent of the available screen area give a reasonably satisfactory compromise between these two conflicting requirements. The actual widths of the strips, which need not all be the same, are determined by considerations of color balance in the light emitted from the strips in operation. In practice, we have found that a rectangular screen structure with approximately 1200 phosphor strips, when formed on the face plate of a tube sixteen inches in diameter, may appropriately have phosphor strips 9.3 mils wide.

The selection of the position of the space between phosphor strips which is to be left free from willemite, and which will therefore produce the indexing indications in the manner hereinbefore outlined, can also be predicated entirely on considerations of color balance of the image produced on the screen structure. Evidently the only effect of changing the location of this indexing portion will be to alter the reference phase of the fundamental component of indexing signal produced when the beam scans the screen structure. Since this reference phase is known for any particular mode of construction of the screen, mixers 41 and 42 can be constructed to produce properly phased heterodyne components for any index reference phase condition.

In a screen structure for use in a color television receiver system of the general type hereinbefore described, the location of portions thereof having different secondary electron emissive characteristics is normally predetermined in the construction of the screen structure. Therefore it is appropriate to effect the variations in the resistance of material underlying the surface of the screen structure by utilizing different materials having different inherent resistivities and/or different thicknesses for these different portions. However, there are other applications of cathode ray tube screen structures in which the locations of different screen portions having different secondary electron emissive characteristics is not predetermined. Rather it is desired to provide a screen structure of such a nature that any desired portion thereof may be given one or another secondary electron emissive characteristic under the influence of some readily controllable stimulus such as, for example, the electron beam of the cathode ray tube itself, or an external source of illumination.

Figure 3:
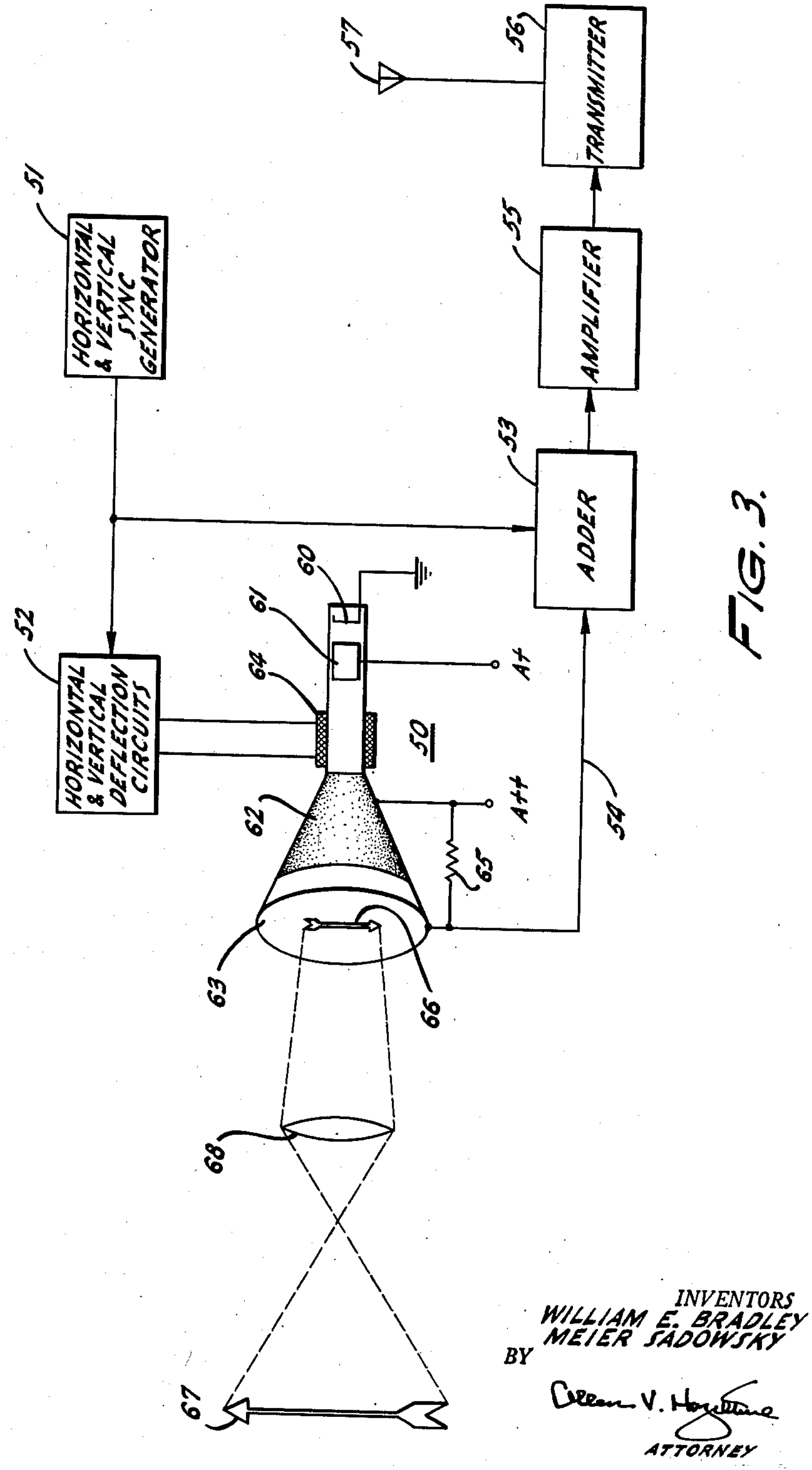
Figure 3 shows a television transmitter system including a camera cathode ray tube equipped with a screen structure which embodies our invention.
Figure 4:
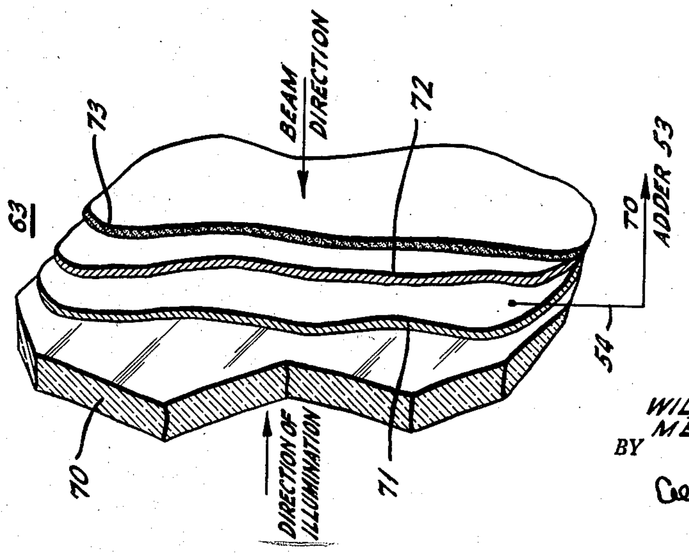
Figure 4 is a greatly enlarged fragmentary view of the screen structure of Figure 3.

Figures 3 and 4 of the drawings, to which more particular reference may now be had, show the application of a screen structure embodying our invention to a camera tube wherein the screen structure is responsive to external illumination in the manner hereinbefore indicated. The transmitter system shown in Figure 3 is conventional in all respects except in the details of construction of the cathode ray tube 50 and in the manner of deriving output signals therefrom. The conventional elements of this transmitter system include a conventional horizontal and vertical synchronizing signal generator 51 adapted to produce the usual horizontal and vertical synchronizing signals, as well as the pedestal pulses upon which these synchronizing signals are superposed in accordance with present standards. The output signals from this sync generator 51 are supplied to the conventional horizontal and vertical deflection circuits 52 of the camera tube 50 and also to an adding circuit 53. In the latter they are conventionally combined with the camera signals derived by way of conductor 54 from the camera tube 50 in a manner hereinafter explained in detail. The composite video signal available at the output of adder 53 is then supplied by way of a conventional video amplifier 55 to the remaining conventional transmitter circuits collectively designated by rectangle 56. The latter may comprise a conventional source of radio frequency signals, a modulator supplied with the video signals from amplifier 55 and with the radio frequency signals and operative to modulate the amplitude of the radio frequency signals in accordance with the video signal variations, a suitable number of radio frequency amplifying stages following this radio frequency modulator, and connections from the output of these radio frequency amplifier stages to the transmitter antenna 57. The camera tube 50 contains certain of the elements of a conventional cathode ray tube—namely, a cathode 60, adapted to produce a beam of electrons, a conventional first anode 61 supplied with suitable positive potential from a conventional source of anode potential A+, and a conventional second anode 62 supplied with suitable high positive potential from a conventional second anode potential source A++. The cathode ray tube 50 also comprises a screen structure 63, which, since it particularly embodies our invention, will be discussed in detail hereinafter. The cathode ray tube 50 is further provided with conventional horizontal and vertical deflection coils 64 supplied with the usual deflecting signals from horizontal and vertical deflection circuits 52, these signals being of such a nature as to cause the electron beam to trace a conventional scanning raster upon the screen structure 63. This screen structure is supplied with unidirectional potential of a suitable value lower than that of the second anode potential by way of a screen dropping resistor 65 connecting the screen structure 63 to the source of anode potential A++. Upon this screen structure 63 there is projected the image 66 of an object 67 which it is desired to televise, this projection being preferably effected by means of a conventional lens system diagrammatically illustrated in Figure 3 by lens 68. There is formed, on the screen structure 63, a pattern of light and dark portions corresponding in configuration to the light and dark portions of the scene to be televised. The details of construction of this screen structure 63 are illustrated in Figure 4 to which more particular reference may now be had. This screen structure is formed on a transparent substrate preferably made of an insulating material such as glass. In practice, this substrate may be the face plate of the cathode ray tube 50. Upon that surface of this substrate 70 which confronts the electron beam, when incorporated in the cathode ray tube, there is deposited a layer of transparent conductive material 71. Stannic oxide is a material suitable for the formation of this layer 71, but numerous other materials equally suitable are known, including a variety of other metal conductors deposited in sufficiently thin layers so as to provide the desired conductivity while, at the same time, permitting substantially uninhibited passage of light from the image to be televised. The external conductor 54, through which picture signals are derived from this screen structure, is connected to this conductive layer 71. Next there is deposited, upon the beam confronting surface of conductive layer 71, another layer of a material which is responsive to illumination to vary its resistance to the flow of electrical current. A variety of materials, generally known as photo-conductors are suitable for the formation of layer 72. They include zinc sulphide, selenium, antimony trisulphide, and many others. Finally, upon the beam confronting surface of photo-conductive layer 72, there is deposited still another layer 73 formed of a good secondary emitter material such as magnesium oxide, for example. When an image is projected upon the screen structure 63 of Figure 4, in the manner shown in Figure 3, the photo-conductive layer 72 is illuminated by this image through glass substrate 70 and transparent conductive layer 71. Since the resistance of this photo-conductive layer is a function of illumination and since, particularly, its resistance decreases as the illumination becomes more intense, the different light intensities of different portions of the televised image will be reproduced on the screen structure 63 by correspondingly located portions having correspondingly different resistance. As the electron beam is now swept across this screen structure to form thereon its conventional scanning raster, impinging upon secondary electron emissive surface layer 73, secondary electrons will be emitted from this surface layer in numbers which depend, as has been previously explained, upon the resistance to electrical current flow of the layer 72 immediately underneath the electron emissive surface layer 73. Since portions of the screen structure having low resistance will emit more secondary electrons than portions having higher resistance, as hereinbefore explained, and since portions of the screen structure which are brightly illuminated will have lower resistance than portions which are only dimly illuminated, there will also be a dependence of the number of secondary electrons emitted from any particular portion of the screen upon the intensity of illumination of this same portion. Consequently, as the beam scans the illumination pattern produced by the televised scene, and the corresponding pattern of varying resistance, the screen current flowing through screen resistor 65, necessary to replenish the supply of secondary electrons emitted from the surface portion 73 of the screen structure will vary as a function of the instantaneous resistance of consecutively scanned elements of the screen structure. This current variation and the resultant voltage variation which it produces, then constitutes the output signal of the camera tube 50 and is transmitted to adding circuit 53 in the manner and for the purposes hereinbefore indicated.

It is to be noted that the beam with which this screen structure is scanned is preferably of constant intensity so that variations in the screen current which constitute the output signal of the camera tube are due solely to variations in illumination of the screen structure by the televised scene. This, in turn, permits the omission of the conventional beam intensity control grid electrode from the cathode ray tube 50. However, should it be preferred, for reasons of simplicity of construction, to use conventional electron gun arrangements including such a control grid it would be a simple matter to maintain this control grid at a constant potential relative to the cathode so that it would have no intensity varying effect on the beam. Note further that, so long as the scene which is being televised remains unchanged, a fixed resistance pattern will be produced therein. Consequently, on consecutive scans of the beam across the screen structure, the same form of output signal will be produced. Should the scene which is being televised be subject to variations between successive scans, then the resultant illumination pattern on the screen structure will also change and with it the resistance pattern within the screen structure. On consecutive scans of this screen surface the same regions thereof will be differently responsive to beam impingement to emit electrons, so that changes in the scene to be televised will be accurately reflected by corresponding changes in the output signal of the camera tube.

Figure 5:
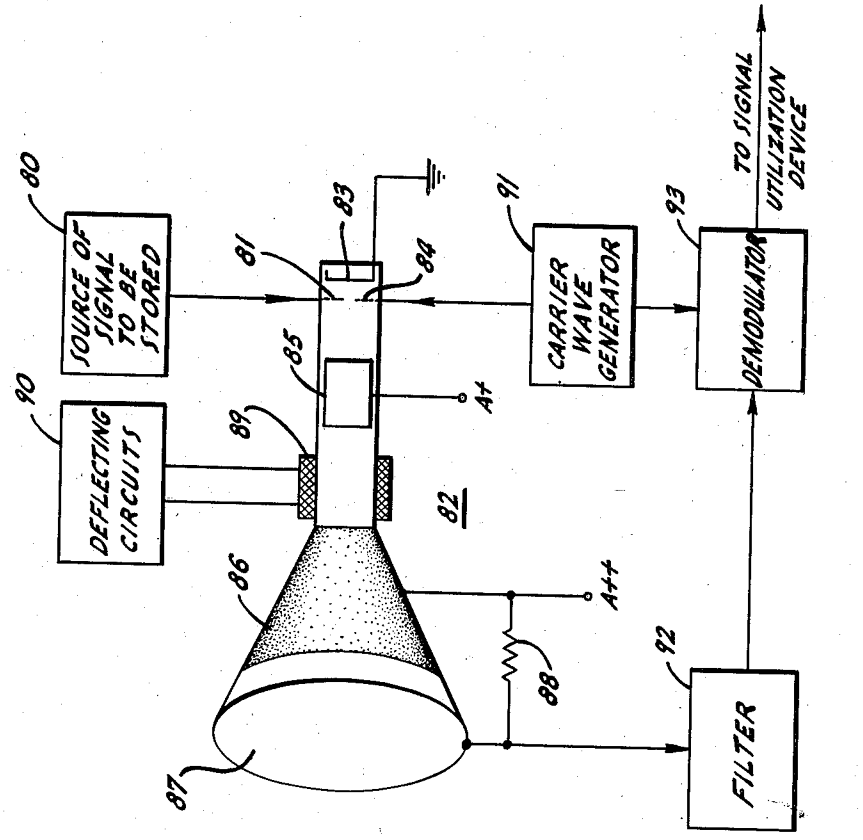
Figure 5 shows an electrical signal storage system including a cathode ray tube equipped with a screen structure like that of Figure 4.

As has been indicated previously, screen structures embodying our invention also lend themselves to incorporation in cathode ray tubes adapted for the storage of electrical signal intelligence. An embodiment of such a storage system, including a screen structure according to our invention, is illustrated in Figure 5 of the drawings, to which more particular reference may now be had. This system comprises a source 80 of an electrical signal bearing intelligence representative variations which it is desired to store. Such storage is desired in a wide variety of situations, as, for example, in electronic computers, in moving target indicating radar systems, and the like. For the purposes of our invention, it is immaterial what the nature of the intelligence conveyed by this signal from source 80 may be. Therefore further details of construction of this source need not be set forth. The intelligence representative signal from this source is supplied to grid 81 of cathode ray tube 82. This cathode ray tube may have a double beam gun structure similar to that of the color cathode ray tube illustrated in Figure 1. Thus it will include a cathode 83, and control grids 81 and 84 which are additionally shaped so as to split the electron beam emitted from cathode 83 into two separate portions whose intensities are separately controllable by the control grids 81 and 84 and the potentials respectively applied thereto. The beams transmitted by control grids 81 and 84 are accelerated and focused by conventional first anode 85 supplied with suitable first anode potential from a source of such potential A+. The cathode ray tube 82 is further provided with a second anode 86 connected to a suitable source of second anode potential A++, with a screen structure 87 embodying our invention, and with a screen output resistor 88 interconnecting the source of second anode potential A++ and the screen structure 87. The cathode ray tube 82 is also equipped with suitable electromagnetic beam deflection coils 89 which receive deflecting signals from conventional deflection circuits 90 which, depending upon the particular application of the storage tube as a whole, may or may not be synchronized with the input signal which is to be stored therein so as to cause the electron beams to scan a raster on the screen structure 87 which has a predetermined spatial relationship to the intelligence borne by the signal from source 80. In the event that no such synchronism is desired, the deflecting circuits and the deflecting coils 89 may be so constructed as to produce a conventional television scanning raster on the screen structure.

The screen structure 87 of the storage tube 82 may be constructed in substantially the same manner as the screen structure 63 of the camera tube 50, illustrated in detail in Figure 4 of the drawings. Thus, the screen structure 87 may also be formed on a dielectric substrate such as the glass face plate of the cathode ray tube and may comprise a layer of transparent conductive material deposited on this glass substrate, a layer of photo-conductive zinc sulphide material deposited on the electron beam confronting side of this transparent conductive layer, and finally a layer of magnesium oxide deposited on the beam confronting surface of the photo-conductive layer. The zinc sulphide material, which forms the layer directly beneath the magnesium oxide surface layer of this sandwich-like screen structure, has not only the property of varying its conductivity as a function of its illumination by an external source of light but also has, in common with a number of other photo-conductive substances, the additional property of emitting light in response to impingement by an electron beam. This additional characteristic, which is of no particular importance in the application of this screen structure to a camera tube where an external source of illumination is provided in order to produce a useful output signal, is utilized in the application of the same screen structure to the storage tube 82 under consideration. When the portion of the electron beam whose intensity is under the control of grid 81, and which will be hereinafter referred to as the "writing" beam, traces its scanning pattern upon the screen structure 87, it will produce illumination of consecutively scanned elements of this screen structure with an intensity which depends upon the intensity of the electron beam while impingent on these particular elements. This illumination of the screen structure, although internally produced, will nevertheless modify the resistivity of the zinc sulphide layer with the further result that the number of secondary electrons emitted from the beam confronting surface layer of magnesium oxide will also vary. Since the illumination of any particular element of this screen structure ceases as soon as the beam has left that element, the resistivity of that same element will also return to the normally high value which it has in the absence of illumination. Therefore, whatever charge may have accumulated on the beam confronting surface of this same element during impingement of the electron beam thereon will now be dissipated only through the high resistance of the unilluminated zinc sulphide layer. Consequently, this charge will be retained on the surface layer for relatively long intervals of time, the actual duration depending upon the resistivity of the unilluminated zinc sulphide. By the controlled addition of impurities the resistivity of the zinc sulphide may be varied within relatively wide limits, thereby making it possible to vary the time during which the screen structure is capable of storing a charge. For example, an excess of zinc in the zinc sulphide will raise this resistivity while an excess of sulphur will lower it. Other materials which may be added to control the resistivity of the zinc sulphide are copper and germanium. Since the charge accumulated on any particular screen element is dependent upon the number of secondary electrons emitted relative to the number of electrons received from the beam during impingement of the latter thereon, and since this ratio is, in turn, determined by the intelligence signal controlled beam intensity, the charge on the beam confronting magnesium oxide surface of the screen structure will also vary in accordance with variations in signal intelligence. Thus there will be formed, on the beam confronting surface of the screen structure 87, a charge pattern whose variations are indicative of intelligence variations in the received signal and this charge pattern will be retained, unless "erased" in one of several ways hereinafter described, for a period determined by the unilluminated resistivity of the zinc sulphide photo-conductive layer.

The electron beam directing elements of the cathode ray tube 82 are preferably so constructed that the portion of the electron beam emitted from cathode 83, which is under the control of grid 84 and which will hereinafter be referred to as the "reading" beam, follows the same scanning path as the writing beam but lags behind the latter by some predetermined amount. Consequently this reading beam will sweep across portions of the screen structure which have acquired charges indicative of the intensity of the writing beam. As the reading beam sweeps across these charged portions it will produce illumination of the zinc sulphide layer of the screen structure with consequent reduction of its resistivity. If this reading beam is maintained at a constant intensity the amount of current which flows to the screen structure through this now conductive zinc sulphide layer will be a function of the charge previously accumulated thereon as a result of impingement by the writing beam. The variations in screen current which are due to reading beam traversal of the screen elements charged in different amounts in accordance with signal intelligence variations will produce corresponding changes in the current flowing through screen resistor 88, and likewise corresponding changes in the potential developed across this resistor. These variations constitute the desired output signal from this storage tube since they have a form which corresponds to the intelligence representative variations in the signal which is stored thereby. However, since the writing beam may be scanning one portion of the screen structure at the same time that the reading beam is scanning another portion of the screen structure, there will be variations in screen current and also in screen output potential due not only to variations in screen charge accumulations discharged by the reading beam but also to variations in writing beam intensity occurring under control of the signal to be stored. Since these two output potential variations are normally in the same frequency range, they would be indistinguishable in the absence of further precautions. Of course, it is always possible to permit the reading beam to be turned on only while the writing beam is turned off. However, this makes it necessary for the writing beam to be permitted to scan a complete raster on the screen structure before any of the information stored thereby can be recovered. At times it is desired to begin the recovery of stored intelligence before this entire scanning process has been completed. Where this is the case, a carrier wave generator 91 may conveniently be coupled to the beam intensity control grid 82 so that the intensity of the reading beam is modulated at some high frequency preferably well above the rate of signal variation due to stored intelligence. The charge pattern on the screen structure will then produce amplitude modulation of the high frequency screen current variations produced by this modulated reading beam and this amplitude modulation can readily be recovered separately from amplitude variations due to the writing beam by a simple filter 92 constructed to transmit one or both of the modulation sidebands produced by modulation of the carrier wave frequency signal by the intelligence representative charge pattern. The output signal from filter 92 may then be supplied to a demodulator 93 to which the output signal from carrier wave generator 91 is also supplied. This demodulator 93, which may be of any conventional construction, will then produce heterodyne components including one at the fundamental frequency of the intelligence representative input signal to the storage tube and having the same form as the latter. Thus the stored signal may be recovered without interference from the writing beam and this output signal from demodulator 93 may then be supplied to any desired signal utilization device. It is apparent that, if the reading beam is kept at a low intensity compared to the minimum intensity of the writing beam, the signal intelligence stored during a single scan of the writing beam may be reproduced upon several successive scans of the reading beam, as the charge accumulated upon the screen structure is only partly discharged by the low intensity reading beam. If it should be desired to erase the stored information more rapidly, then the intensity of the reading beam can be increased or a source of intense illumination may be provided which may be used to illuminate the screen structure whenever it is desired that this erasure take place. Such illumination of the photo-conductive zinc sulphide layer decreases its resistance considerably so that rapid discharge of the intelligence representative charge takes place.

In addition to being responsive to electron beam impingement to emit light and to modify its own resistivity in response to such light emission because of its photo-conductive properties, zinc sulphide also has the property of impact conductivity. That is, it is responsive to electron beam impingement to vary its own resistivity independently of variations thereof due to light emission. Consequently, the modification in secondary emission characteristic produced by electron impingement upon a storage tube screen structure incorporating zinc sulphide, as hereinbefore described, will be due in part to its property of impact conductivity.

Other materials are known which exhibit the property of impact conductivity to an even more marked degree than zinc sulphide. Some of these materials are also photo-conductive and responsive to electron beam impingement to emit light, but even those which are not, and which rely for their changes in resistivity only on their impact conductivities, are nevertheless suitable to form the interior portion of a storage tube screen structure according to our invention.

It will be noted that, since the screen structures used in the camera tube and in the storage tube of Figures 3 and 5 respectively may be substantially similar, a charge will be accumulated upon unilluminated portions of the screen structure, when used in a camera tube, by reason of scanning of the electron beam across these unilluminated portions. In order to prevent this accumulation of charge from modifying the current output of the camera tube upon subsequent scans of these unilluminated portions, it is a simple matter to make the photo-conductive layer of a material having such a resistivity that, even from unilluminated portions of the screen structure substantially complete discharge of any charges accumulated on the secondary electron emissive surface layer takes place between successive scans of the electron beam.

Furthermore, while the thickness of the surface layer in the storage tube screen is preferably chosen so that a large fraction of the beam traverses it and reaches the underlying material whose conductivity it is desired to modify thereby, in the case of the camera tube screen, the surface layer thickness is preferably so selected that the beam just barely penetrates through the entire surface layer. Thus, the effect of the beam in reducing the resistivity of unilluminated regions of the interior portion is held to a minimum in the camera tube screen. It will be clear that the choice of any particular surface thickness depends upon the beam impingement velocity, which is in turn determined by the tube operating potentials. It is, of course, well within the skill of the art to select an appropriate surface thickness in accordance with the foregoing criteria for any given operating conditions.

It will be understood that still other embodiments and applications of screen structures according to our invention will occur to those skilled in the art. Consequently we desire the scope of this invention to be limited only by the appended claims.

We claim:

1. A target electrode for a cathode ray tube, said electrode being responsive to electron impingement to emit secondary electrons and the secondary electron emissivity of said electrode differing depending upon the region of the surface of said electrode which is impinged by electrons, said electrode comprising a substrate of electrically insulating material, a first layer of uniformly conductive material deposited on said substrate, a second layer of material deposited on said first layer, said second layer having certain regions constructed to provide resistance of predetermined value to the flow of electrical currents and said second layer having other regions constructed to provide resistance of a substantially different value to the flow of electrical currents, and a surface layer of secondary electron emissive material deposited on said second layer.

2. A structure according to claim 1 and further characterized in that said surface layer is made of a secondary electron emissive material having inherent secondary electron emissivity greater than unity.

3. A structure according to claim 1 and further characterized in that said surface layer is made of material having substantially uniform inherent secondary electron emissivity.

4. A structure according to claim 1 and further characterized in that said surface layer is formed of a secondary electron emissive material having relatively low resistance to current flow in a direction transverse to said electrode surface and having relatively high resistance to electrical current flow in a direction parallel to said electrode surface.

5. A structure according to claim 1 and further characterized in that said surface layer is formed principally of magnesium oxide.

6. A target electrode for a cathode ray tube, said electrode being responsive to electron impingement to emit secondary electrons and the secondary electron emissivity of said electrode differing depending upon the region of the surface of said electrode which is impinged by electrons, said electrode comprising a substrate of electrically insulating material, a layer of uniformly conductive material deposited on said substrate, a plurality of spaced-apart strips of material deposited on said layer, the resistance to the flow of electrical currents of said last-named material being substantially higher than that of said layer of uniformly conductive material, and a surface layer of secondary electron emissive material deposited on said spaced strips and on said layer of uniformly conductive material in the spaces between said strips.

7. A target electrode for a cathode ray tube, said electrode comprising a layer of electrically conductive material, a plurality of spaced strips of activated phosphor materials deposited on said conductive layer, different ones of said spaced strips, disposed in cyclically recurrent order across said conductive layer, being made of materials adapted to fluoresce in different colors, and a continuous layer of magnesium oxide deposited on said phosphor strips and on said conductive layer in the spaces between said phosphor strips.

8. A target electrode for a cathode ray tube, said electrode comprising a layer of electrically conductive material, a plurality of spaced strips of activated phosphor materials deposited on said conductive layer, different ones of said spaced strips, disposed in cyclically recurrent order across said conductive layer, being made of phosphor materials adapted to fluoresce in different colors, unactivated phosphor material filling predetermined ones of the spaces between said activated phosphor strips, predetermined others of said spaces being left unfilled, and a continuous layer of magnesium oxide deposited on said activated phosphor strips, on said unactivated phosphor material and on said conductive layer in said unfilled spaces.

9. A structure according to claim 8 characterized in that said unactivated phosphor material filling predetermined spaces between activated phosphor strips is willemite.

10. In a cathode ray tube comprising a source of an electron beam: a target electrode for said beam, said target electrode being responsive to beam impingement to emit secondary electrons and the secondary electron emissivity of said electrode depending upon the region of said electrode which is impinged by said beam, said electrode comprising a sandwich-like structure having a surface layer of secondary electron emissive material confronting said source of an electron beam, an underlying contiguous layer of material, said underlying layer having certain regions constructed to provide resistance of a predetermined value to the flow of electrical current and said underlying layer having other regions constructed to provide resistance of a substantially different value to the flow of electrical current, and the thickness of said surface layer being such that at least some of the electrons constituting said beam penetrate through said surface layer and into said underlying layer, and a third layer of materials contiguous to said underlying layer and made of a conductive material.

References Cited in the file of this patent

UNITED STATES PATENTS

| | | |
|---|---|---|
| 1,906,448 | De Boer et al. | May 2, 1933 |
| 2,141,322 | Thompson | Dec. 27, 1938 |
| 2,177,736 | Miller | Oct. 31, 1939 |
| 2,266,595 | Fraenckel | Dec. 16, 1941 |
| 2,343,825 | Wilson | Mar. 7, 1944 |
| 2,540,635 | Steier | Feb. 6, 1951 |
| 2,544,754 | Townes | Mar. 13, 1951 |
| 2,630,548 | Muller | Mar. 3, 1953 |
| 2,631,259 | Nicoll | Mar. 10, 1953 |